United States Patent [19]

Morgan

[11] Patent Number: 4,654,664
[45] Date of Patent: Mar. 31, 1987

[54] ELECTRONIC NULL-SEEKING GONIOMETER FOR ADF

[75] Inventor: David J. Morgan, Satellite Beach, Fla.

[73] Assignee: Rockwell International Corporation, El Segundo, Calif.

[21] Appl. No.: 736,014

[22] Filed: May 20, 1985

[51] Int. Cl.$^4$ .............................................. G01S 5/04
[52] U.S. Cl. ................................... 342/440; 342/429; 342/431; 342/441
[58] Field of Search .............. 343/429, 431, 432, 440, 343/441

[56] References Cited

U.S. PATENT DOCUMENTS 2,744,246  5/1956  Granqvist ........................... 343/431
4,368,470  1/1983  Mori et al. ......................... 343/441
4,507,663  3/1985  Mori et al. ......................... 343/440

Primary Examiner—Theodore M. Blum
Attorney, Agent, or Firm—Robert C. Mayes; George A. Montanye; H. Fredrick Hamann

[57] ABSTRACT

Described herein is a system providing an electronic null-seeking goniometer for use in automatic direction finding equipment. A microprocessor is used to generate sine and cosine information in response to the detected phase of the bearing signal. The microprocessor iteratively locates the transmitter in the null of the cardioid response pattern of the loop and sense antennas, without rotating either the loop and sense antenna set or the goniometer. This eliminates the requirement for moving antenna and goniometer components and is constructed entirely devoid of any rotating machinery. A loop feedback signal functionally related to the detected null angle provides a stable null location method, without audio distortion, at relatively high feedback-/signal ratios.

1 Claim, 3 Drawing Figures

ELECTRONIC NULL-SEEKING GONIOMETER FOR ADF

BACKGROUND OF THE INVENTION

This invention relates to electronic radio receivers and more particularly to automatic direction finding equipment utilizing a microprocessor implementation.

Direction finding equipment has been utilized in a variety of implementations to provide a bearing from the receiving station to the transmitting station since the advent of widespread use of radio. The original equipments utilized a movable antenna loop which would be manually rotated by the operator to detect the strongest signal. Thereafter the angle of the loop position provides a bearing or reciprocal bearing to the transmitting station. The sense antenna is utilized to eliminate ambiguity when a question may arise as to whether the bearing or its reciprocal is the appropriate angle. This sense and loop antenna combination develops a cardioid pattern, is well known in the art, and provides a single null from which the operator can readily derive the appropriate bearing information.

Subsequent developments in automatic direction finding equipment eliminated the need for rotating antennas with the use of goniometers (RF resolvers) which allowed the use of a fixed loop antenna, in combination with a smaller rotating loop facsimile within the receiver proper. This facilitated the application of ADF equipment to aircraft by eliminating the requirement for moving external antennas.

Subsequently, the need for the rotating goniometer was eliminated by the use of phase comparison of a reference signal, usually 90 Hz, with that of the received station after being modulated by the loop switching frequency sine and cosine signals in the balanced modulator, as is known in the art, to determine the relative bearing to the transmitter. The bearing to the station, $\theta$, may then be formed by applying the DC sin $\theta$ and DC cos $\theta$ signals to a sin/cos RMI or by finding $\theta$ from:

$$\theta = \tan^{-1} (DC \sin \theta)/(DC \cos \theta)$$

This system has the advantages of entirely eliminating the need for any movement in the receiver or its antennas and can be implemented in relatively simple hardware or with the use of microprocessor and associated radio equipment.

This phase comparison method, although useful, has some inherent disadvantages in that the 90 Hz modulation signal will be readily detected by the operator should a high sense loop ratio or comparison signal be desired to provide a higher comparison ratio. This is particularly noticeable when the transmitting station is a commercial broadcast station providing an audio program, and the operator desires to listen to the content of the audio broadcast, for example to ascertain the identity and therefore location of the transmitting station. While listening to the audio content, the phase comparison system may frequently develop a relatively strong audio distortion in the phase comparison process. If so, the audio signal will tend to be garbled by the 90 Hz signal. This problem is highlighted by the need in the phase comparison system for relatively high sense loop ratios because the system tends to be relatively easily disturbed by a stronger interferring transmitter in close angular proximity to a weaker targeted transmitting station. To merely increase the sense loop ratio to overcome this difficulty can result in a highly distorted audio output.

Additionally, phase measuring techniques are susceptible to envelope delay of the modulation through the receiver or phase shift of the bearing signal following demodulation. Any envelope delay or phase shift of the bearing signal causes a bearing error and means must be provided to calibrate the system and minimize bearing variations over environmental conditions, particularly temperature variations.

SUMMARY

Accordingly, it is an object of the present invention to provide an extremely stable automatic direction finding apparatus providing a minimum of distortion to a received audio signal during ADF operation and to minimize the effects of envelope delay in the I.F. on the bearing accuracy of the system.

Another object of the present invention is to provide an ADF system requiring no moving goniometer components while improving the stability and reliability of the ADF function without distorting audio signals received from the transmitting station.

Briefly, and in accordance with the present invention, a fixed null-seeking goniometer for an automatic direction finder comprises a first loop antenna input means for detecting a first signal produced by a received radio wave, a second loop antenna (the second loop being at 90° with respect to the first loop) input means for detecting a second signal produced by said radio wave substantially simultaneously with the first signal, and means for relaying the respective angles of incidence of the radio wave first and second signals to each other in a trigonometric fashion, and summing the related signals to provide a third signal. A sense antenna input means is additionally provided receiving a fourth signal produced by said radio wave, and coupled to means for phase shifting the third summed signal approximately one-fourth cycle, and summing the shifted third signal with the fourth signal to generate a fifth signal. The phase angle (either 0° or 180°) of the fifth signal is thereafter detected and results in generation of a digital control signal. This digital control signal is input into a microprocessor which calculates the trigonometric relationship of the phase angle, and outputs two offset signal inputs to said first and second loop antenna input means, respectively, one offset signal positive and the other negative, thereby providing a cancelling feedback resulting in null determination. A null is determined when the phase angle substantially coincides with the angle of incidence of the received radio wave.

This feedback generation is an iterative process utilizing the speed of the microprocessor to quickly locate the null by injecting cancelling feedback into the loop antenna sensors, as a trigonometric function of a first phase angle, a second phase angle, and so forth, until the phase angle is appropriately identified. This system is extremely rapid and is much more stable, particularly during periods of fading reception and atmospheric disturbance, than previous methods of phase comparison.

Another advantage of the null-seeking ADF system presently disclosed is the amplitude measuring aspect. The loop modulation is nulled before amplification by the receiver. Previous phase measuring techniques, such as the phase comparison method discussed previously, are sensitive to envelope delay or sideband phase shift in the receiver. With such phase comparison receivers, special phase shift cancellation or envelope delay compensation techniques are necessary because any envelope delay appears as a bearing error. These problems are completely eliminated by a null cancelling feedback system such as presently disclosed.

DETAILED DESCRIPTION OF THE INVENTION

Figure 1:
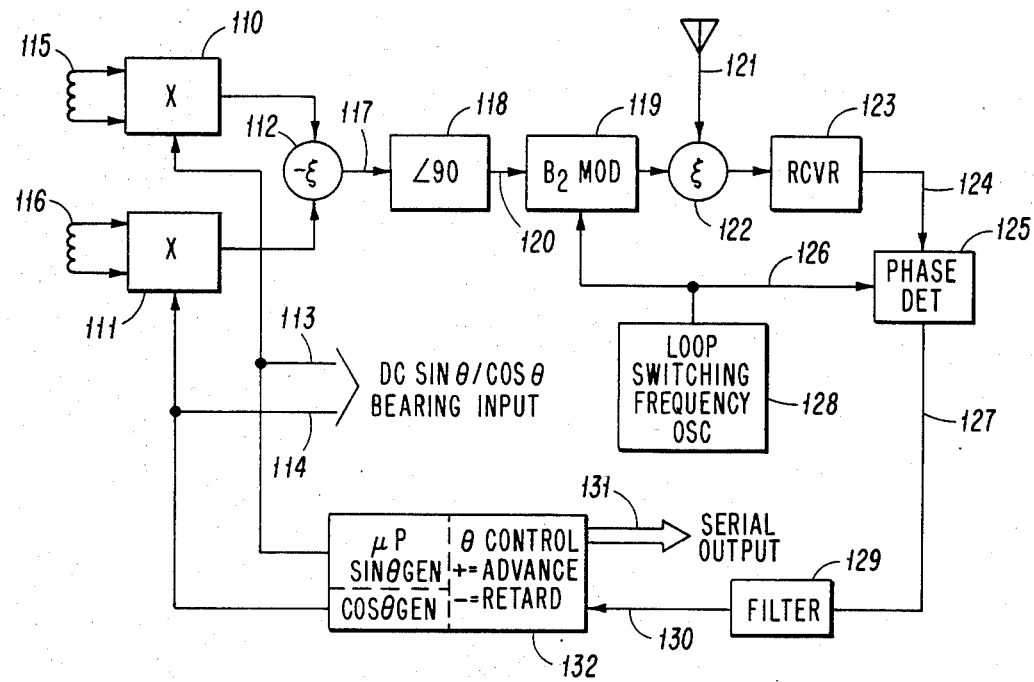
FIG. 1 is a schematic block diagram of one embodiment of the present invention showing a typical microprocessor-controlled feedback to the loop antenna sensors.

Referring now to FIG. 1, a schematic block diagram of one embodiment of the present invention shows a typical microprocessor-controlled feedback to the loop antenna sensors. Loops 115 and 116 are physically located at right angles to each other and are each coupled to the respective loop multipliers 110, 111 to provide outputs to subtracting junction 112; thereafter the summed output 117 is input into the phase shift block 118. The 90° phase shifted output 120 is input into the balanced modulator 119, thereafter into summing junction 122 to be summed with the signal from sense antenna 121. The combined output is then input into the receiver 123, amplified, and the output 124 is phase detected (esesentially either 0° or 180° phasing) in combination with the output 126 from the loop switching frequency oscillator 128, also providing input 126 to the balance modulator 119. When phase detector 125 provides an output signal 127 into the filter 129 providing input 130 to microprocessor 132, essentially as a plus-or-minus signal to phase control generation of the feedback signals (sin $\theta$, cos $\theta$). These respective outputs are provided back to the loop antenna multipliers 110, 111 on lines 113, 114 until signal 130 is essentially zeroed. It can be seen that a relatively simple software routine can be utilized to iteratively neutralize signal 130 for any given phase signal input and the operator has a choice of receiving a serial output 131 containing the bearing information or a direct reading DC sin $\theta$, cos $\theta$ bearing input on lines 113, 114. Thus the system in FIG. 1 is readily adapted to provide an output to a digital display or an analog control head utilizing a resolver type indicator.

Figure 2:
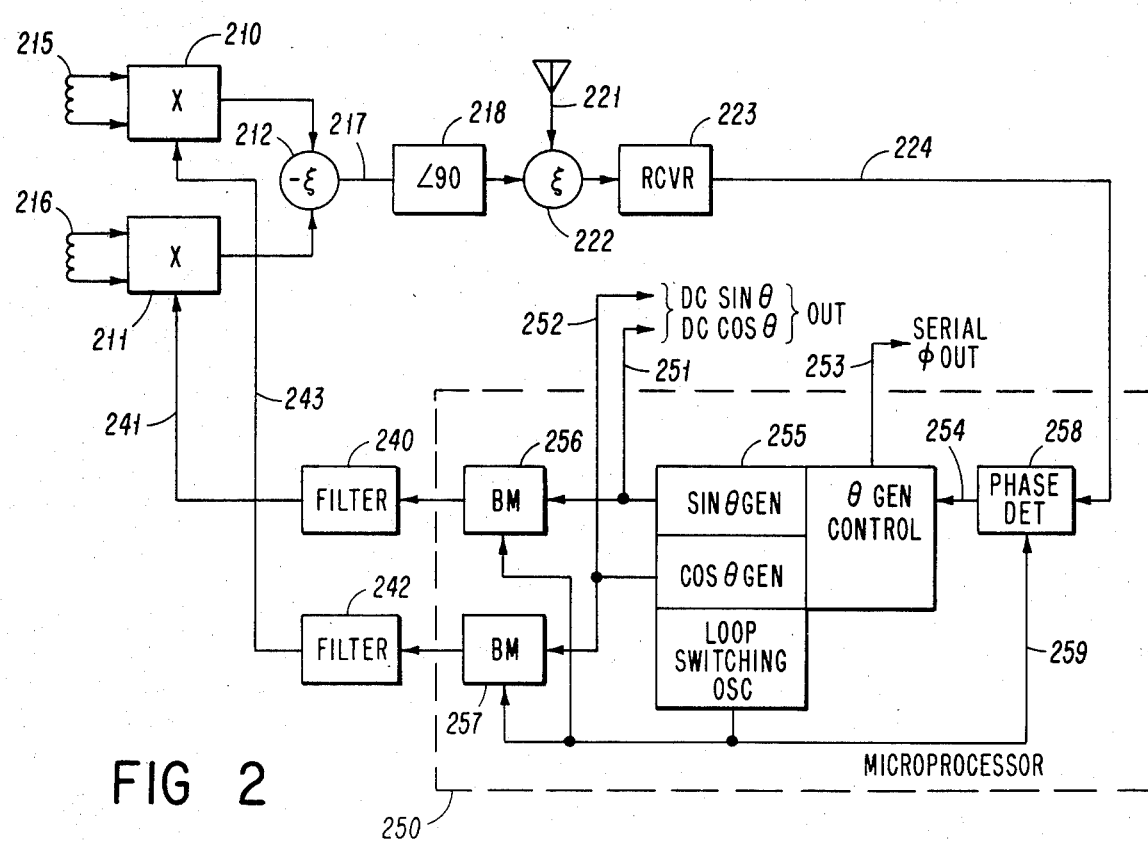
FIG. 2 is a schematic block diagram of an alternative embodiment of the present invention showing a reduced hardware requirement for implementing the advantageous features of the present invention.

Referring now to FIG. 2, an alternative embodiment of the present invention is shown eliminating the separate loop switching frequency oscillator 128 of FIG. 1, and incorporating significantly more of the hardware into the microprocessor function together with associated software. The loop antennas 215, 216 are again physically located in a perpendicular relationship, each coupled to the respective loop antenna sensors 210, 211 to provide outputs to subtracting network 212. The summed output 217 is thereafter input to 90° phase shifter 218, thereafter into summer 222 also receiving the sense antenna 221 input to provide the summed input to receiver 223. The output is thereafter phase detected by phase detector 258 receiving the input 224 and the loop switching oscillator input 259 to provide the phase control signal 254 into the $\theta$ generator control, which thereafter provides the serial phase output on line 253. The software provides the calculation of the sin $\theta$ and cos $\theta$ outputs shown in block 255, which outputs are additionally provided external to the microprocessor 250 on lines 251 and 252 as a DC sin $\theta$ and DC cos $\theta$ output. Balance modulators 256 and 257 receive the DC sin $\theta$, DC cos $\theta$ inputs respectively, and provide, through filters 240, 242 outputs 241 and 243, respectively, to the loop antenna sense circuits 211 and 210.

The major portion of the hardware shown in FIG. 1 has been eliminated in FIG. 2 through incorporating the loop switching oscillator and phase detection function within the microprocessor. This eliminates a significant amount of hardware, thereby reducing weight and required volume and power.

The null locating feedback aspect has the significant advantage of eliminating the 90 Hz phase comparison signal which had previously caused problems in the prior art designs. Furthermore, the advantage of cancelling the signal through appropriate feedback inputs prior to amplification by receiver 223 significantly improves the accuracy of the device by improving the sensitivity of the actually amplified signal on line 224, thereby eliminating envelope delay, and sideband phase shift problems in the receiver. A secondary advantage of this configuration is the advantage of having reduced circuitry requirements for signal processing, reducing further the typical additional noise caused by that circuitry and additionally improving reliability.

The design of a system utilizing the present invention may be more readily understood by reference to the following mathematical equations, in reference to FIG. 1. The terms are defined as follows:

$e_1$ = the output signal of loop 115
$e_2$ = the output signal of loop 116
$e_3$ = the output signal of multiplier 110
$e_4$ = the output signal of multiplier 111
$e_5$ = the output signal 120 of phase shifter 118
$e_6$ = the feedback signal 113 from microprocessor 132 to multiplier 110
$e_7$ = the feedback signal 114 from microprocessor 132 to multiplier 111

Then:

$$e_1 = (K_1 \sin \phi) H$$
$$e_2 = (K_1 \cos \phi) H$$

Where
 $\phi$ is the relative bearing to the transmitter;
 H is the incident magnetic field of the transmitted signal; and
 $K_1$ is an arbitrary constant consistent with the design requirement.

and
 $e_6$ = a voltage proportional to cosine $\theta$
 $e_7$ = a voltage proportional to sine $\theta$
  where $\theta$ is an arbitrary angle which will determine the bearing to the transmitter when in the null.

$$e_3 = (e_1)(e_6)$$
$$= (K_1 \sin \phi) H][K_2 \cos \theta]$$
$$e_4 = (e_2)(e_7)$$

$$= [(K_1 \cos \phi)H][K_2 \sin \theta]$$

$e_5$ is a minimum when:

$$e_4 - e_3 = 0$$

or $$[(K_1 \sin \phi)H][K_2 \cos \theta] - [(K_1 \cos \phi)H][K_2 \sin \theta] = 0$$

Therefore:

$$[(K_1 \sin \phi)H][K_2 \cos \theta] = [(K_1 \cos \phi)H][K_2 \sin \theta]$$

and $$\frac{K_1 (\sin \phi)H}{K_1 (\cos \phi)H} = \frac{K_2 \sin \theta}{K_2 \cos \theta}$$

Therefore $$\tan \phi = \tan \theta, \text{ in the null.}$$

The signal at $e_5$ is:

$$e_5 = e_3 - e_4$$

$$= [(K_1 \sin \phi)H][K_2 \cos \theta] - [(K_1 \cos \phi)][K_2 \sin \theta]$$

$$= K \sin (\phi - \theta)$$

where K is a constant of proportionality. The voltage of $e_5$ is balance modulated and combined with the sense voltage 121.

An error voltage 127 is developed by comparing the phase polarity of the loop switching oscillator signal 126 with the demodulated signal 124 in the phase detector 125.

Figure 3:
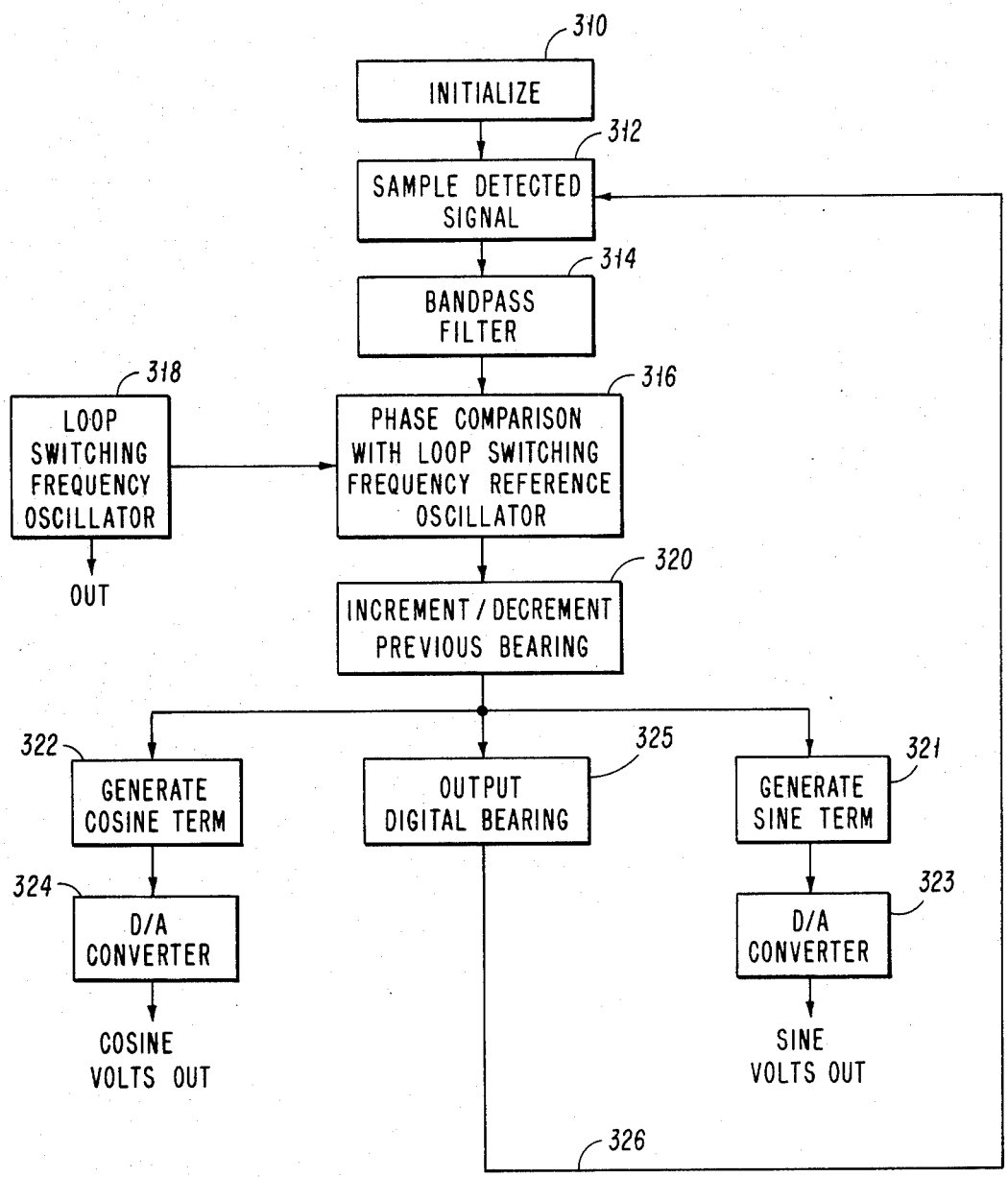
FIG. 3 is a software flow diagram showing one example of a typical software calculation program for use in conjunction with the hardware of FIGS. 1 or 2.

Thereafter, the microprocessor 132 generates the appropriate cancelling feedback signals, $\sin \theta$ and $\cos \theta$, to drive $e_5$ to zero. Referring now to FIG. 3, a software flow diagram is shown demonstrating the relatively straightforward application of the previously described operation for use in conjunction with the hardware of FIG. 1 or FIG. 2. The microprocessor or logic circuitry is initialized 310, then directed to sample the detected signal 312. Thereafter, the signal is filtered at 314 and compared with the loop switching frequency oscillator 318 for a phase comparison 316. The result having a positive or negative aspect causes the previously retained bearing to be incremented or decremented as a direct function of the resulting sign. The bearing is then output in digital format 325 to provide a digital output 326 which may be displayed and further sampled in subsequent iterations. Additionally, a cosine $\theta$ and sine $\theta$ are generated as functions of the bearing 322, 321, respectively, and thereafter converted from digital to analog output 324, 323, to provide the cosine $\theta$ and sine $\theta$ voltage outputs. Thereafter the process is iteratively repeated until the output digital bearing 326 provides no increment or decrement to the previous bearing in block 320. By utilizing the two loops in a 90° physical position to each other in combination with the sense antenna, a single null is determined by this method, providing an extremely rapid and accurate direction determination.

While the present invention has been described with respect to certain embodiments disclosed herein, it is not intended that this description be construed in a limiting sense. Various modifications of the illustrative embodiments, as well as other embodiments of the invention will be apparent to persons skilled in the art upon reference to this description. It is therefore contemplated that the appended claims will cover any such modifications of embodiments as fall within the true scope of the invention.

I claim:

1. A fixed null-seeking goniometer for an automatic direction finder comprising:
   a. first loop antenna input means for detecting a first signal produced by a received radio wave;
   b. second loop antenna input means for detecting a second signal produced by said radio wave substantially simultaneously with said first signal;
   c. means for relating the respective angles of incidence of said radio wave first and second signals to each other in a trigonometric fashion, and summing said related signals to provide a third signal;
   d. third sense antenna input means for detecting a fourth signal produced by said radio wave;
   e. means for phase shifting said third signal approximately one-fourth cycle, and summing the shifted third signal and said fourth signal to generate a fifth signal;
   f. means for detecting the phase angle of said fifth signal, and for generating a digital control signal therefrom; and
   g. a microprocessor for receiving said digital control signal, calculating the trigonometric relationship of said phase angle, and outputting two offset signal inputs to said first and second loop antenna input means, respectively, thereby providing a cancelling feedback resulting in null determination, said null determined when said phase angle substantially coincides with the angle of incidence of said radio wave.

* * * * *